United States Patent [19]
Girguis

[11] Patent Number: 5,643,092
[45] Date of Patent: Jul. 1, 1997

[54] ASSEMBLY FOR AXIALLY FIXING A SPLINED HUB ON A SPLINED SHAFT

[76] Inventor: Sobhy Labib Girguis, Magdalenenstrasse 19, D-53842 Troisdorf, Germany

[21] Appl. No.: 517,007

[22] Filed: Aug. 18, 1995

[30] Foreign Application Priority Data

Aug. 18, 1994 [DE] Germany ................ 44 29 256.2

[51] Int. Cl.$^6$ .................................. F16D 3/224
[52] U.S. Cl. ................. 464/145; 403/359; 464/906
[58] Field of Search .................... 464/144, 145, 464/146, 906; 403/359

[56] References Cited

U.S. PATENT DOCUMENTS

| | | | |
|---|---|---|---|
| 2,844,013 | 7/1958 | Spence | 464/145 |
| 2,987,897 | 8/1961 | Spence et al. | 464/145 |
| 3,446,035 | 5/1969 | Enke | 464/142 |
| 3,865,499 | 2/1975 | Flichy | 403/359 X |
| 3,928,985 | 12/1975 | Girguis | 464/144 X |
| 4,244,196 | 1/1981 | Staeheli et al. | 464/906 X |
| 5,122,096 | 6/1992 | Aucktor et al. | 464/145 |
| 5,499,884 | 3/1996 | Kühnhold et al. | 403/359 |

FOREIGN PATENT DOCUMENTS

| | | | |
|---|---|---|---|
| 2921352 | 12/1979 | Germany . | |
| 3025731 | 2/1982 | Germany | 464/145 |
| 255572A1 | 4/1988 | Germany . | |
| 4042277 | 7/1992 | Germany | 464/145 |
| 4207839A1 | 9/1993 | Germany . | |
| 1320698 | 6/1973 | United Kingdom | 464/146 |
| 2259349 | 3/1993 | United Kingdom | 464/139 |

*Primary Examiner*—Daniel P. Stodola
*Assistant Examiner*—Eileen A. Dunn

[57] ABSTRACT

An axial fixation of a splined shaft connection, particularly between a hub of a constant velocity joint and a shaft, whereby a splined end of the shaft is to be inserted in and extracted out of a splined bore of the hub from one side thereof. A snap ring is in contact with a stop surface of the shaft and a holding surface of groove in the hub. The snap ring and the holding surface are situated in the extraction direction axially behind the carrying zone of the splines, whereby the hub is provided with an opening following the holding surface having a radius which is greater than the radius of the radially-opposed portion of the shaft by an amount which is at least equal to the radial width of the snap ring.

15 Claims, 4 Drawing Sheets

ASSEMBLY FOR AXIALLY FIXING A SPLINED HUB ON A SPLINED SHAFT

FIELD OF THE INVENTION

My present invention relates to an assembly for axially fixing a splined hub on a splined shaft utilizing a snap ring.

BACKGROUND OF THE INVENTION

In German Patent 41 09 481 a snap ring of a special shape is under compression in a deep groove of a shaft during insertion of the shaft into a hub and springs out into a groove of the hub upon reaching an end position. When the hub and shaft are provided with splines as in this system, the snap ring is located within the axial extent of the splines so that it frequently is not visible nor accessible for disassembly at least from one side of the system. The visual inspection of the snap ring is impeded and the mode by which the hub is held on the shaft by the snap ring, i.e. in form retention, force retention or both is limited. The splines may be weakened by the formation of the grooves therein and, since grooving often must occur through the spline, for the formation of burrs and sharp edges is possible.

In German patent 42 07 839, similar problems are encountered because the special contours for retaining the snap ring are provided within the axial extent of the splines. During insertion of the shaft in the hub, the snap ring is displaced from one groove of the shaft to another and at the same time into a groove of the hub. This construction tends to weaken the spline and to be somewhat complex to produce. It also creates problems in assembly and disassembly.

OBJECTS OF THE INVENTION

It is the principal object of the present invention to provide a simple, inexpensive and reliable attachment of a spline to a spline shaft, whereby the drawbacks of earlier systems will be avoided and, especially, visual inspection from one side is facilitated and disassembly without damage to the snap ring can be carried out in a simple manner.

Another object of the invention is to provide a connection between a splined hub and a splined shaft which will not weaken the splines and which can effectively be in a connection mode between force retention and form retention.

Still another object of the invention is to provide an improved simple and reliable system for axially fixing a hub to a shaft.

SUMMARY OF THE INVENTION

These objects and others which will become apparent hereinafter are attained, in accordance with the invention, by locating the stop surface, the snap ring and the holding surface axially alongside the carrying zone of the splines in the extraction direction, the hub having an opening behind the holding surface whose radius is greater than the radius of the shaft in this region by an amount at least equal to the radial width of the snap ring.

More particularly, the assembly of the hub, preferably of a constant-velocity joint, and the shaft can comprise:

a member provided with a hub formed internally with hub splines axially spaced from a hub opening at one side of the hub, and a groove between the opening and the hub splines;

a shaft having a portion provided with shaft splines received in the hub and interfitting with the hub splines, the hub being withdrawable from the shaft in an extraction direction; and a snap ring engaged between the hub and the shaft for axially fixing the hub on the shaft, the shaft being formed with a stop surface located alongside the shaft splines on a side thereof corresponding to the one side of the hub and braced against the snap ring, the groove of the hub being formed with an annular flank forming a holding surface braced against the snap ring, the snap ring being disposed between the holding surface and the stop surface, the opening having a radius greater than a radius of the shaft at a location surrounded by the opening by an amount at least equal to a radial width of the snap ring.

The axial separation of the splines from the fixation zone allows their independent layout and hence the optimization of both functions, facilitating production and use. The arrangement of the fixation zone on the insertion side enables the snap ring, after the shaft is inserted in the hub, to be simply introduced between the stop surface of the shaft and the holding surface of the hub, through the opening of the hub. The snap ring is therefore visible and can be disassembled in the opposite direction.

For a fixation of the shaft in the insertion direction, the invention locates the fixation zone axially substantially alongside the region of the extraction fixation. Both fixations can therefore be also independently optimized.

When the stop surface is placed substantially in the radial region of the splines, the diameter of the shaft in the axial region of the opening or in the region adjacent to the splines, can then be set to be equal to the minor diameter of the splines. The torsional strength of the shaft is optimal and the production is simplified.

To avoid interruption of the holding surface, for example during the broaching of the splines of the hub, the invention provides that this surface is radially substantially outside the region of the splines.

The length of the stop surface can be advantageously increased by making it inclined. The layout of the fixation will then be easier and the form of the shaft will be streamlined. A fixation is thus created, in which the snap ring will be stressed only in compression.

Visual inspection of the assembly is facilitated and there is a considerable simplification of the disassembly when the groove of the hub intersects at least one void in the hub, visible from the one side. The snap ring can then be more easily seen and reached. The inner part of a ball constant velocity joint, especially of the so-called Rzeppa joint, is normally designed as a hub, having tracks therein, which (or their extension) can be regarded as voids in the sense of this invention.

The extraction prevention of the present invention can be set within large limits. If the holding surface has a cone angle, which is not smaller than the cone angle of the stop surface, the fixation will then be form-retainer. If the holding surface has a cone angle, which is smaller than the cone angle of the stop surface, the fixation will act between a self-retained and a force-retained, depending on the difference of the angles, whether the difference is slightly smaller or bigger than the sum of the angles of friction of the stop and holding surfaces to the snap ring. The stop and holding surfaces can, in both cases, be axially preloaded by the snap ring, in which case, an axially play-free fixation will be obtained.

A stop surface and a limiting surface can be provided at low cost and in a reliable manner, by a radial projection of the shaft.

An extension of the ends of the snap ring can result in a much simpler assembly and disassembly. The distance between the extensions can enable inspection of the assembly by a glance. A particularly useful configuration is achieved when the extensions are axially directed or when the void is provided as a confined enlargement of the opening.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
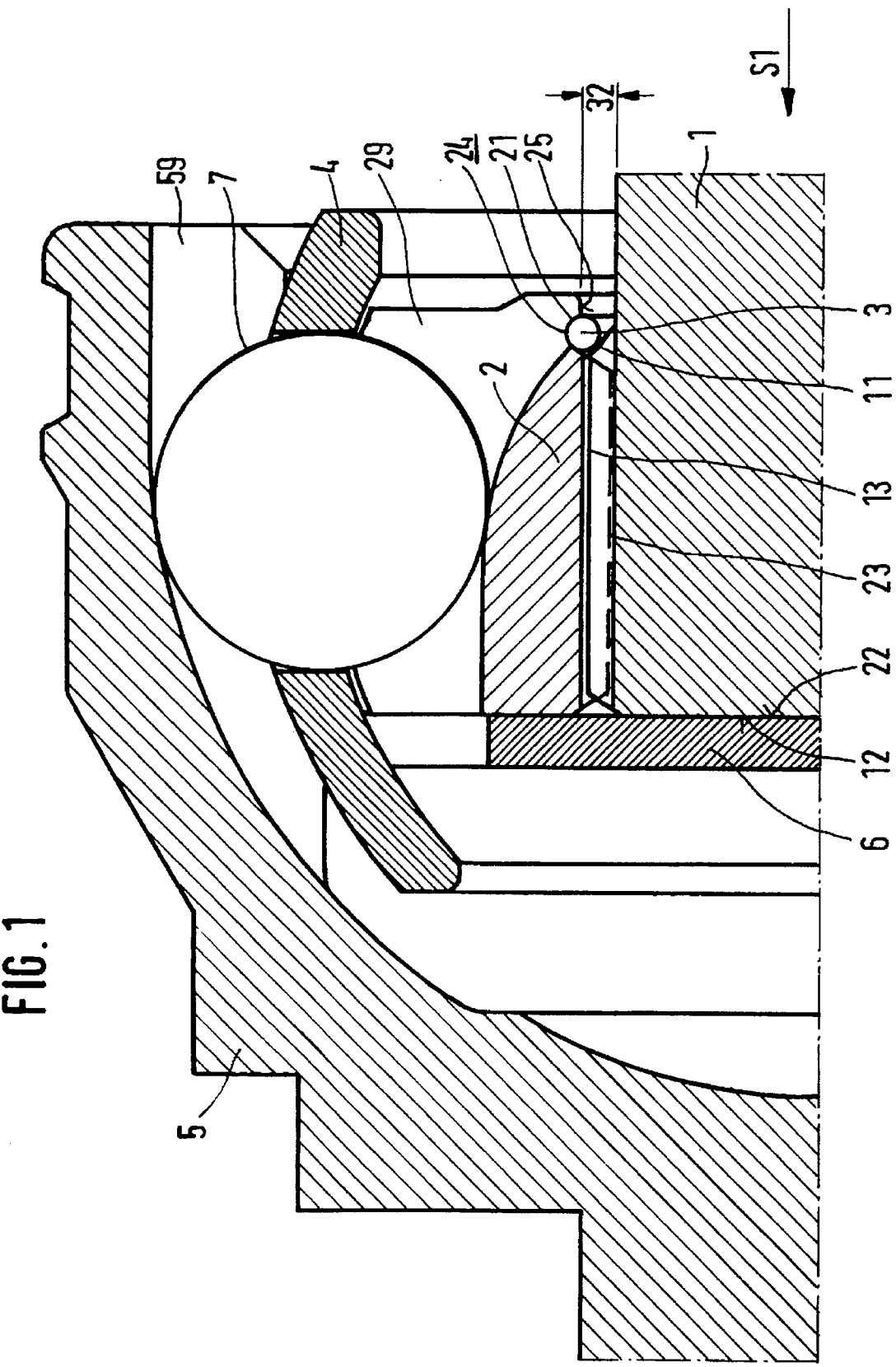
FIG. 1 is a cross section which shows a form-retained axial fixation of a constant velocity joint of the so-called Rzeppa type.

FIG. 1 shows a configuration of the so-called Rzeppa constant velocity joint, composed of a bell 5, a hub 2, a ball cage 4, which holds a number of balls 7 in the tracks or voids 59 and 29 of the bell and the hub 2, and a supporting disc 6. The splines 13 of the shaft 1 can be slid in the splines 23 of the hub 2, until the parts are axially fixed.

The shaft 1, with its limiting surface 12, will be stopped in the insertion direction by abutment with the counter surface 22 of the supporting disc 6. Subsequent to the insertion of the shaft 1, the snap ring 3 will be brought in through the opening 25 into the groove 24 of the hub. The radial distance 32 between the opening 25 and the shaft 1 is thus slightly greater than the diameter of the round snap ring 3.

The extraction of the shaft 1 will be then prevented by means of the snap ring 3 and the holding surface 21. The stop surface 11 is inclined and the holding surface 21 and the outgoing surface of the groove 24 to the opening 25, is shaped to be almost radial. The axial fixation is therefore form-retained, whereby the stop surface 11, upon forces tending to extract the shaft, pushes the snap ring 3 against the holding surface 21 into the groove 24.

The groove 24 or the snap ring 3 intersect the voids 29 of the hub 2. The position of the assembled snap ring will therefore be visible through each void 29, and the snap ring is hence easily accessible. The disassembly will be also facilitated, by radially inwardly pressing the visible parts of the snap ring 3. The inspection of the assembling and a damage-free disassembling are however also possible without the voids 29.

The layout of the extraction fixation is remarkably simple, yet very effective. The splines 13 and 23 are not provided with any grooves or special contours, and hence are rigid as well as inexpensive to produce. The stop surface 11 is only composed of the side surfaces of the splines 13. The diameter of the shaft 1 is set as an extension of the minor diameter of the splines 13, and has therefore a comparable polar section modulus.

An interrupted quasi-line contact prevails between the stop surface 11 and the snap ring 3. This pair can still be highly loaded, as the surface of the shaft 1 and the snap ring will, as a general rule, be hardened for strength purposes. On the other side, between the snap ring 3 and the groove 24, a surface contact is provided for which a hardening of the hub at this location may be unnecessary.

Figure 2:
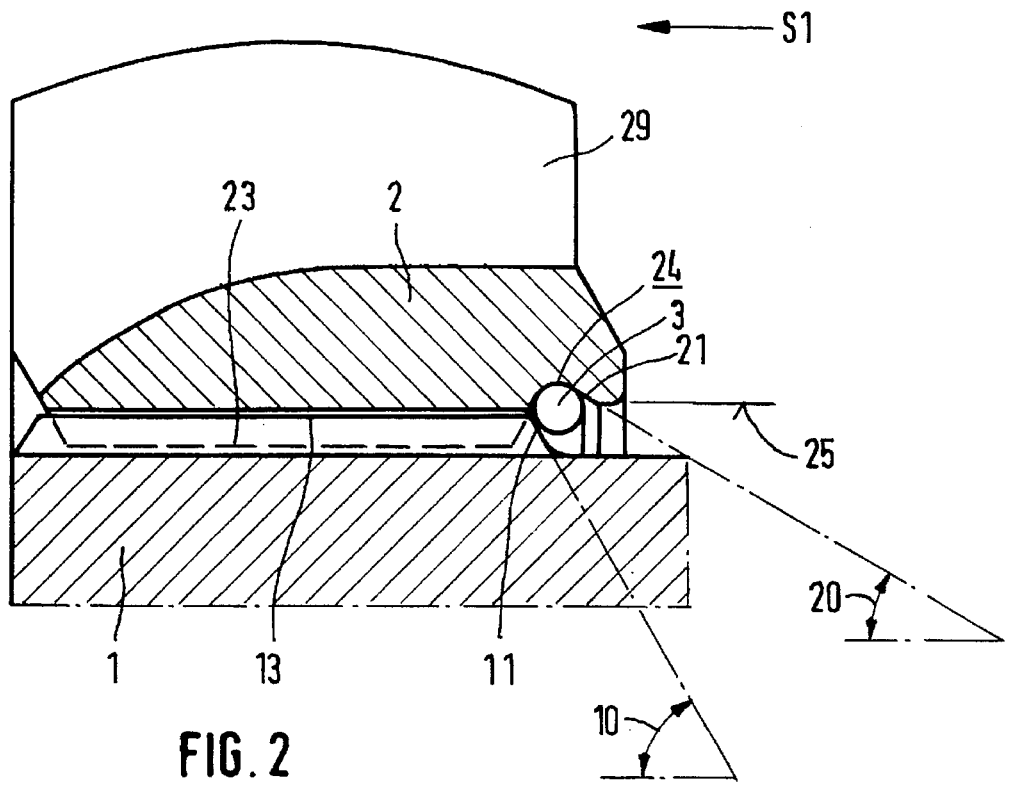
FIG. 2 is an axial section of a second embodiment illustrating force-retained axial fixation.

The axial fixation or the extraction prevention of the spline connection of FIG. 2 is different from that of FIG. 1 in that the groove or the snap ring 3 does not intersect with any voids of the hub 2. The groove 24 is furthermore provided with a holding surface 21a, which will be loaded upon extraction of the shaft 1 from the hub 2. This holding surface 21a provides a cone angle 20, which is smaller than the cone angle 10 of the stop surface 11a, so that snap ring 3, upon the extraction of the shaft 1 from the hub 2 with a corresponding force, will be compressed to be smaller and disassembled. This force depends on the cone angles 10 and 20, on the preload and resistance of the snap ring, on any possible press fit of the splines, and on the friction angles between the stop surface 11a or holding surface 21a and the snap ring. An axial fixation independent of the force or a form-retained axial fixation, can be provided with the appropriate layout of the cone angles 10 and 20.

Figure 3:
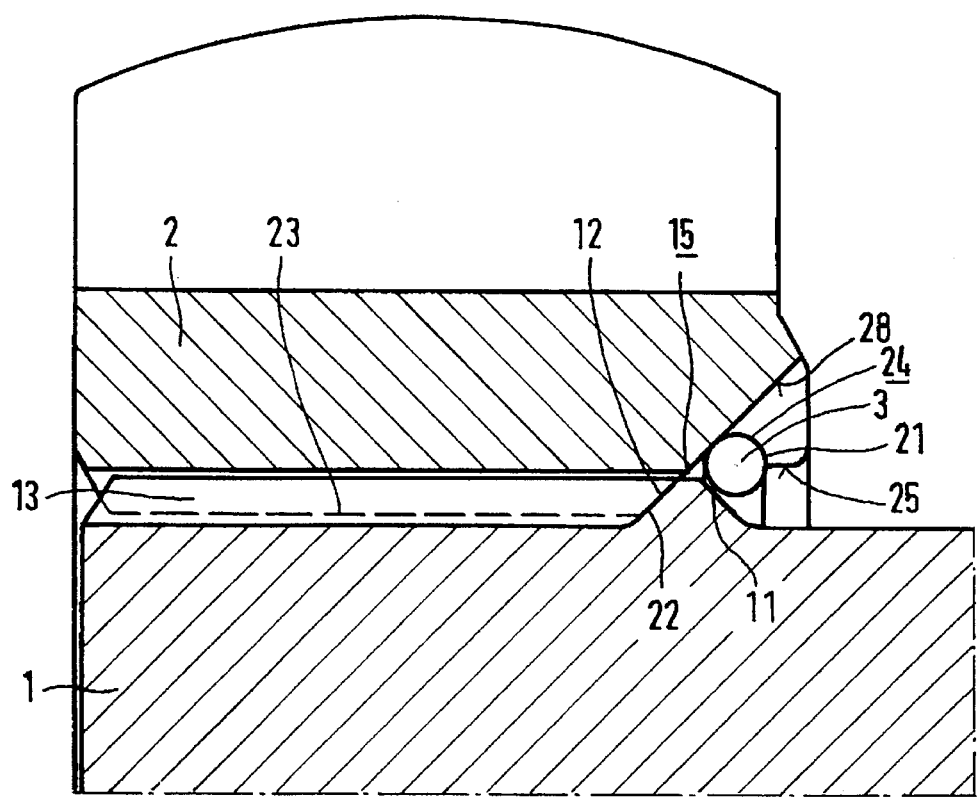
FIG. 3 is an axial section of a third embodiment illustrating an axial fixation on one side for both directions.

The shaft 1 of FIG. 3 provides a radial projection 15 with a non-interrupted stop surface 11b and a limiting surface 12b. The shaft 1 will be stopped in the extraction direction through the holding surface 21b, the snap ring 3 and the stop surface 11b, and in the insertion direction through the counter surface 22b of the hub 2 and the limiting surface 12b. The extraction prevention is form-retained, as in FIG. 1. One or more voids 28 can facilitate the disassembly for example with a screw driver. The projection 15 lies in the radial extent of the splines, whereby the limiting surface 12b is made up of the side surfaces of the voids between the splines 13 of the shaft 1, and the counter surface 22b is made up of the side surfaces of the splines 23 of the hub 2.

Figure 4:
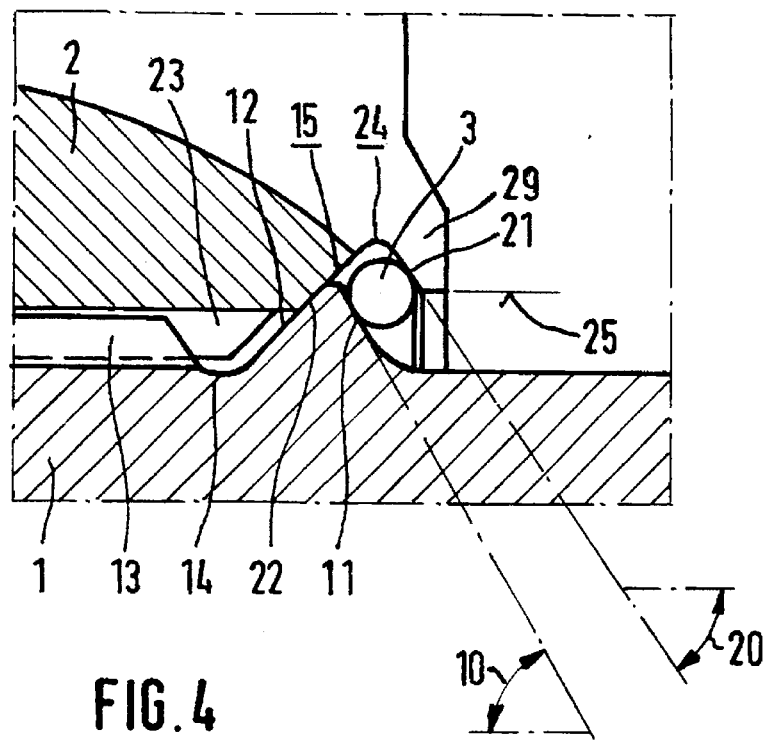
FIG. 4 is a cross sectional view of a fourth embodiment illustrating another axial fixation similar to FIG. 3.
Figure 5:
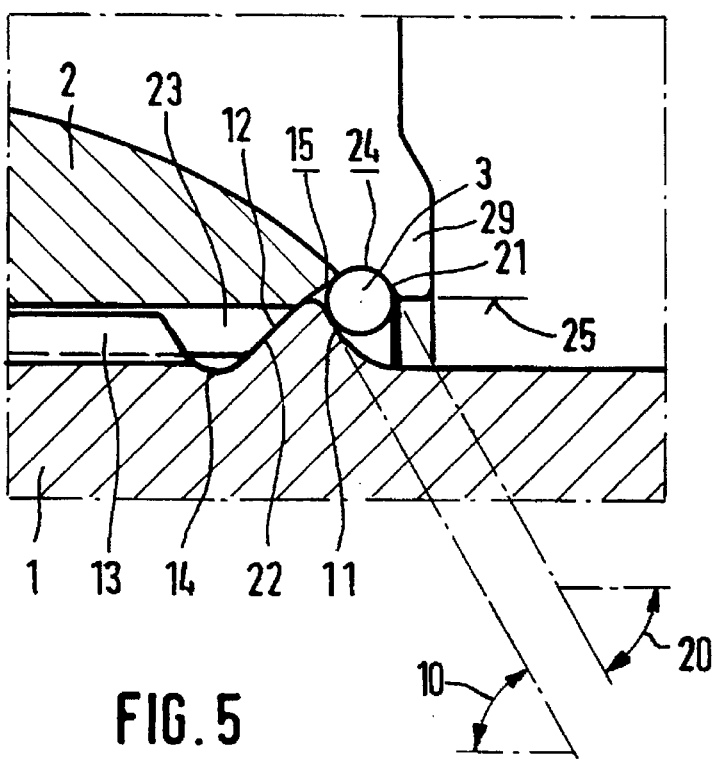
FIG. 5 is a cross sectional view of a fifth embodiment showing another axial fixation similar to FIG. 3.

As expansion groove 14 is provided between the splines 13 of the shaft 1 and the limiting surface 12c of FIG. 4 or 12d FIG. 5. A rotative cold forming of the splines 13 is facilitated, or the cost reduced. The projection 15c of FIG. 4 is designed to be higher than the major diameter of the splines 23 of the hub 2, with which a surface contact between the limiting surface 12c and the counter surface 22c, outside the radial extent of the splines, will be possible. To the contrary, the counter surface 22d of the hub 2 of FIG. 5 lies within the radial extent of the splines.

The groove 24 of the hub 2 in FIG. 4 is provided with a holding surface 21c, having a cone angle 20 with respect to the snap ring 3, which is a little bit smaller than the cone angle 10 of the stop surface 11c (of projection 15c) with respect to the snap ring 3. A self-retained, but also a play-free axial fixation will be created herewith. Through the (elastic) expansion of the snap ring 3, the surfaces 11c, 21c, 12c, 22c of the axial fixation will hereby preload each other, play-free.

By contrast, the cone angles 10 and 20 of FIG. 5 are equal, so that the fixation will be form-retained with a little play, which however only depends on the production tolerance of the groove 24 (which provides the holding surface 21d and the counter surface 22d), of the projection 15d (which provides the stop surface 11d and the limiting surface 12d), and of the snap ring.

Figure 6:
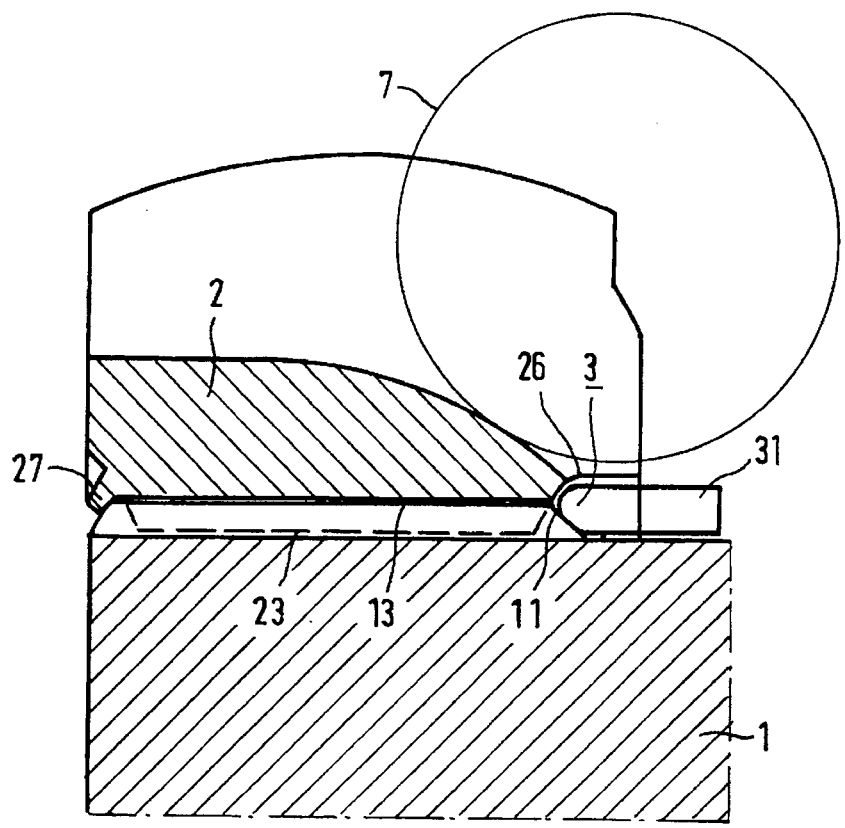
FIG. 6 is a section through a sixth embodiment showing an axial fixation which is particularly easy to handle.
Figure 7:
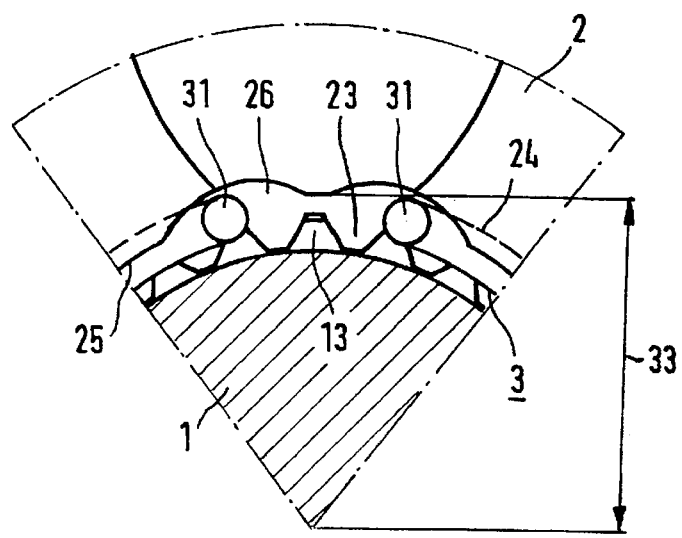
FIG. 7 is a side view of FIG. 6 in the insertion direction.

FIGS. 6 and 7 show another design of the axial fixation according to the present invention. Simple coined locations 27 are provided to stop the shaft 1 in the insertion direction.

For the extraction direction, a snap ring 3 is applied, each end of which provides an axial extension 31, situated in a void 26 of the hub 2. For assembly, the snap ring 3 can be compressed over the extensions 31 by means of a simple pair of pliers, inserted and allowed to expand in the groove 24. Further voids (28, 29) of the hub 2 are not necessary for a simple optical inspection, as the distance between the extensions 31 offers a good inspection feature. As the extensions 31 project in the axial direction, the distance 33 at the middle of the void 26 needs only to be approximately equivalent to the radius of the opening 25.

The preferred position of the ball 7 at a maximum joint angle of a constant velocity joint is shown in FIG. 6, whereby the ball 7 neither touches the snap ring 3 nor its extension 31.

The examples described in the drawing only show round snap rings with circular cross sections, which are particularly cost effective as well as reliable. The stop, limiting and counter surfaces are also exclusively conical, so that the transient zones have less stress concentrations and require less space. The teaching of the invention does, however, not exclude other forms of snap rings, for example unround, or other cross sections, for example oval, six or four-sided, or other designs of the stop, limiting or counter surfaces.

I claim:

1. An axial shaft/hub attachment assembly comprising:
a member provided with a hub formed internally with hub splines axially spaced from a hub opening at one side of said hub, and a groove between said opening and said hub splines;
a shaft having a portion provided with shaft splines received in said hub and interfitting with said hub splines, said shaft being insertable in and withdrawable from said hub from said one side; and
a snap ring engaged between said hub and said shaft for axially fixing said hub on said shaft, said shaft being formed with a stop surface located alongside said shaft splines on a side thereof corresponding to said one side of said hub and braced against said snap ring, said groove of said hub being formed with an annular flank forming a holding surface braced against said snap ring, said snap ring being disposed between said holding surface and said stop surface, said opening having a radius greater than a radius of the shaft at a location surrounded by said opening by an amount at least equal to a radial width of the snap ring, enabling said snap ring to be introduced through said opening after insertion of said shaft in said hub.

2. The assembly defined in claim 1 wherein said shaft has a limiting surface engageable with a counter surface having a determined axial position relative to said hub, said limiting surface and said counter surfaces being located alongside said snap ring with said stop and holding surfaces and alongside said splines of said shaft and said hub.

3. The assembly defined in claim 1 wherein said stop surface is provided substantially within a radial extent of said splines of said shaft.

4. The assembly defined in claim 1 wherein said holding surface is arranged substantially radially outwardly of a region of said splines.

5. The assembly defined in claim 1 wherein said holding surface is a conical surface.

6. The assembly defined in claim 1 wherein said stop surface is a conical surface.

7. The assembly defined in claim 1 wherein the groove intersects at least one void formed in an outer surface of said hub and visible from said one side thereof.

8. The assembly defined in claim 1 wherein said holding surface is conical and stop surface are both conical and the angle of conicity of said holding surface is less than an angle of conicity of said stop surface.

9. The assembly defined in claim 1 wherein said snap ring preloads said holding surface, said stop surface, said limiting surface and said counter surface.

10. The assembly defined in claim 1 wherein said shaft has a radial projection formed with said stop surface.

11. The assembly defined in claim 1 wherein said shaft has a radial projection formed with said limiting surface.

12. The assembly defined in claim 1 wherein said shaft has a radial projection formed with both said stop surface and said limiting surface.

13. An axial shaft/hub attachment assembly comprising:
a member provided with a hub formed internally with hub splines axially spaced from a hub opening at one side of said hub, and a groove between said opening and said hub splines;
a shaft having a portion provided with shaft splines received in said hub and interfitting with said hub splines, said shaft being insertable in and withdrawable from said hub from said one side; and
a snap ring engaged between said hub and said shaft for axially fixing said hub on said shaft, said shaft being formed with a stop surface located alongside said shaft splines on a side thereof corresponding to said one side of said hub and braced against said snap ring, said groove of said hub being formed with an annular flank forming a holding surface braced against said snap ring, said snap ring being disposed between said holding surface and said stop surface, said opening having a radius greater than a radius of the shaft at a location surrounded by said opening by an amount at least equal to a radial width of the snap ring, enabling said snap ring to be introduced through said opening after insertion of said shaft in said hub, said holding surface and said stop surface both being conical, an angle of conicity of said holding surface being less than an angle of conicity of said stop surface.

14. An axial shaft/hub attachment assembly comprising:
a member provided with a hub formed internally with hub splines axially spaced from a hub opening at one side of said hub, and a groove between said opening and said hub splines;
a shaft having a portion provided with shaft splines received in said hub and interfitting with said hub splines, said shaft being insertable in and withdrawable from said hub from said one side; and
a snap ring engaged between said hub and said shaft for axially fixing said hub on said shaft, said shaft being formed with a stop surface located alongside said shaft splines on a side thereof corresponding to said one side of said hub and braced against said snap ring, said groove of said hub being formed with an annular flank forming a holding surface braced against said snap ring, said snap ring being disposed between said holding surface and said stop surface, said opening having a radius greater than a radius of the shaft at a location surrounded by said opening by an amount at least equal to a radial width of the snap ring, enabling said snap ring to be introduced through said opening after insertion of said shaft in said hub, said snap ring having ends formed with extensions projecting through a void of the hub.

15. The assembly defined in claim 14 wherein each extension projects in an axial direction, the void being formed as a circumferentially confined enlargement of the opening.

* * * * *